United States Patent
Winter

(10) Patent No.: US 9,179,657 B1
(45) Date of Patent: Nov. 10, 2015

(54) MOTORIZED JIGGING DEVICE FOR FISHING

(71) Applicant: Lynn A. Winter, Bloomington, MN (US)

(72) Inventor: Lynn A. Winter, Bloomington, MN (US)

(*) Notice: Subject to any disclaimer, the term of this patent is extended or adjusted under 35 U.S.C. 154(b) by 0 days.

(21) Appl. No.: 14/121,020

(22) Filed: Jul. 22, 2014

(51) Int. Cl.
*A01K 97/10* (2006.01)
*A01K 91/06* (2006.01)
*A01K 87/00* (2006.01)

(52) U.S. Cl.
CPC .............. *A01K 91/065* (2013.01); *A01K 87/00* (2013.01)

(58) Field of Classification Search
CPC .............................. A01K 91/06; A01K 91/065
USPC ............. 43/15, 16, 19.2, 21.2, 26.1, 17, 26.2; 248/514, 521, 522
See application file for complete search history.

(56) References Cited

U.S. PATENT DOCUMENTS

| | | | |
|---|---|---|---|
| 2,758,407 A * | 8/1956 | Speidell | 43/19.2 |
| 4,251,939 A * | 2/1981 | Tiede | 43/19.2 |
| 4,339,888 A * | 7/1982 | Sheng-Jung | 43/26.1 |
| 4,536,985 A | 8/1985 | Caviness | |
| 4,660,317 A * | 4/1987 | Evans | 43/19.2 |
| 4,779,371 A * | 10/1988 | Braud | 43/19.2 |
| 4,821,448 A | 4/1989 | Lindaberry | |
| 4,856,222 A | 8/1989 | Hannam | |
| 4,928,419 A | 5/1990 | Forrestal | |
| 4,932,151 A | 6/1990 | Cicha | |
| 4,951,411 A * | 8/1990 | Ecker | 43/19.2 |
| 5,036,616 A | 8/1991 | Wilsey | |
| 5,056,255 A | 10/1991 | Campbell | |
| 5,119,580 A | 6/1992 | Schulte et al. | |
| 5,473,835 A | 12/1995 | Emett | |
| 5,540,010 A | 7/1996 | Aragona | |
| 6,009,656 A * | 1/2000 | Knepp | 43/26.1 |
| 6,363,650 B1 * | 4/2002 | Beeler | 43/19.2 |
| 6,588,137 B1 | 7/2003 | Rozkowski | |
| 6,817,136 B2 | 11/2004 | Novak | |
| 7,309,039 B1 | 12/2007 | Stone | |
| 7,845,106 B2 | 12/2010 | Norman | |
| 8,136,289 B2 | 3/2012 | Modglin | |
| 8,176,673 B2 | 5/2012 | Bruell | |
| 8,307,579 B2 | 11/2012 | Nyland | |
| 8,453,371 B1 | 6/2013 | Sullivan | |
| 8,453,372 B1 | 6/2013 | Moe | |
| 8,497,778 B1 | 7/2013 | Martin | |
| 8,516,739 B2 | 8/2013 | White | |
| 8,579,222 B1 | 11/2013 | Alvarez | |
| 8,615,919 B2 | 12/2013 | Lindgren | |
| 8,627,593 B1 | 1/2014 | Schepp et al. | |
| 8,695,268 B2 | 4/2014 | Gouthro et al. | |
| 2003/0040251 A1 | 2/2003 | Todokoro | |
| 2006/0248778 A1 * | 11/2006 | Ward et al. | 43/19.2 |

* cited by examiner

*Primary Examiner* — William Gilbert

(57) ABSTRACT

A motorized jigging device that can be used with conventional fishing rods and reels. It has a drive wheel attached to a spool-shaped eccentric unit by a pivotal attachment. The eccentric unit supports the handle of a fishing rod. The eccentric unit can be pivotally offset from the drive wheel to travel in a circular path producing a jigging movement as the rod pivots vertically on a fulcrum support. Speed is adjustable by the variable speed motor, and the amplitude of the jigging movement can be easily adjusted by simply pivoting the eccentric unit attached to the drive wheel. It is very simple and can be easily used by fishermen of all ages and abilities. It can have a remote controller to operate the device, including switching the device on and off, adjusting the speed, and setting the duration of the on and off periods of the repeating jigging cycles.

20 Claims, 4 Drawing Sheets

MOTORIZED JIGGING DEVICE FOR FISHING

CROSS-REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

The present invention relates to a motorized jigging device for fishing, and more specifically, it relates to a motorized jigging device for which the frequency and the range of the jigging motion imparted to a fishing rod can be selected and adjusted by the angler.

BACKGROUND OF THE INVENTION

Fishermen use a wide selection of complex equipment and tactics to simulate the action of live bait with their lures. They frequently choose a method of fishing that involves imparting a continuous or intermittent jigging action to a lure to attract fish. Depending upon the mood of the fish, as well as various other conditions, jigging has often proven to be a successful method of angling. Fishermen typically hold the rod in their hand and move it in various patterns to produce numerous types of movement to the lure. However, over a long period of time, this method can become tedious or boring, or it may be difficult for the elderly or disabled. A fisherman may not want to hold the fishing rod or continue to jiggle the rod constantly. In addition, the fishing regulations may allow more than one fishing line to be used by the angler. It is even more challenging to manipulate two lines simultaneously. It may be desirable to manipulate one line manually while using an automatic jigging device for another fishing rod.

For these reasons, at times, it may be desirable to have an automatic jigging device to provide the jigging motion to the fishing rod or to the fishing line. Various methods have been developed to support a fishing rod and, at the same time, provide vibration or repetitive motion to the fishing rod or directly to the fishing line itself. A number of motorized devices have been devised to automatically jig a fishing rod and/or line. These devices include attaching a vibration unit to the rod, cycling the rod vertically while supported on a rotating cam, or repeatedly deflecting the line with a rotating eccentric wheel. These mechanisms may interfere with extracting the rod from the device, quickly setting the hook, and reeling in the line. It can also be difficult to quickly and easily remove the fishing rod from the rod holder when a fish strikes the lure. They may be cumbersome, complex, and difficult to use. Some of these inventions include loose or interchangeable parts which can easily become lost or misplaced. Additionally, these devices typically do not provide a simple method of adjusting the frequency and the range or amplitude of the jigging motion.

Accordingly, there is a need for a simple, easy to use automatic jigging device that overcomes the limitations of those jigging devices of the prior art.

Examples of these inventions are disclosed in the following patents:

A fishing rod holder and jigging assembly is disclosed by Beeler in U.S. Pat. No. 6,363,650, issued on Apr. 2, 2002. In this device the rear support (35) has an oval-shaped opening (36) through which a rear end (37) of the handle portion (12) of the fishing rod (10) can be inserted. This arrangement would result in some impediment to quickly and easily extract the fishing rod to set the hook and reel in the line when a fish bites. Also, the fishing line is routed through guide member (67). This would slow the removal of the rod. The fishing line striker (61) engages the fishing line with each rotation of drive wheel (60). This repetitive action would cause undue wear on the line at the point where the striker strikes the line. In addition, the method of changing the location of the threaded guide member (67) in order to change the jigging movement would be a cumbersome process.

An automatic jigging device for a fishing rod is disclosed by Knepp in U.S. Pat. No. 6,009,656, issued on Jan. 4, 2000. Knepp provides a holder (16) that is a cylindrical sleeve to hold the handle (18) of the fishing rod (12). This sleeve would prevent quick and easy access to extract the rod when a fish bites. The rod could only be removed by the fisherman by pulling it in a longitudinal direction out of the sleeve. The device also utilizes a plurality of interchangeable elliptical cams (22) of various configurations which must be exchanged whenever the fisherman chooses to change the range of the jigging motion of the rod. Also, the cantilever positioning of the rod would necessitate the base support (14) being very securely anchored which would interfere with frequent relocation of the device. The invention is rather complex with a number of moving parts.

A programmable fish line jiggler is disclosed by Tiede in U.S. Pat. No. 4,251,939, issued on Feb. 24, 1981. The Tilde programmable device includes a supply of interchangeable pins (29) to be arranged on wheel (22) by the fisherman to select the pattern of the various individual jigging movements during each revolution of the wheel. This results in a complex jigging action with many small amplitudes of movement with each revolution of the wheel. The disadvantage is that amplitudes of movement are small with the maximum amplitude of movement at the wheel location limited to the radius dimension of the wheel. So the wheel diameter must be rather large in order to provide for much change in amplitude by changing pin locations. In addition, the number of pins constitutes loose parts which can easily become lost or misplaced. Another disadvantage of the invention is that clamp member (17) extends around the rod handle (14). This arrangement would interfere with the fisherman's ability to readily remove the fishing rod to set the hook when a fish bites.

The present invention mitigates and/or obviates the aforedescribed disadvantages of existing measures to provide a simple, convenient, effective motorized jigging devise that can be used by fisherman of all ages and abilities.

BRIEF SUMMARY OF THE INVENTION

The objects of the invention are:
(a) to provide a relatively simple, compact, easily manufactured motorized jigging device for fishermen;
(b) to provide a device having few moving parts and no loose parts that can become lost or misplaced;
(c) to provide a device that can be quickly and easily adjusted for frequency or cadence of the jigging movement and for the range or amplitude of the jigging movement;

(d) to provide a device that can be mounted on various supports and structures, a device that can be readily moved to change fishing locations;

(e) to provide a device with optional remote control wireless capability as well as local control of the variable speed motor;

(f) to provide a device where the remote controller has timing circuitry to set the duration of the alternating on-period and the duration of the off-period of repeating jigging cycles;

(g) to provide a device that can be easily and successfully used be anglers of all ages and abilities;

(h) to provide a device that allows the fisherman to quickly grasp the handle of the fishing rod to set the hook and reel in the line without interference by any of the components of the jigging device;

(i) to provide a device that is versatile and can be used with conventional rods and reel of various types and sizes, and can be mounted on various supports and structures; and (j) to provide a device that can be used as a simple rod holder by removing the motor.

The present invention is a motorized automatic jigging device for fishing. It includes a generally rectangular base with a fulcrum rod support extending upward therefrom to support one point of the fishing rod, and a spaced apart operating mechanism support also extending upward therefrom to support an eccentric assembly unit providing another support point of the rod. A variable speed motor is positioned on a motor support also attached to the operating mechanism support. The variable speed motor is coupled to a rotating axle. The rotating axle is fixedly attached at a right angle to a vertically disposed driven element that may be shaped as a circular wheel or disk, or it may be shaped as a flat, generally rectangular lever that rotates with the rotating axle as one. A spool-shaped eccentric assembly unit is attached by a pivotal attachment to the driven element.

The eccentric assembly unit comprises a horizontal eccentric element fixedly attached to a vertical side-plate or rim at each end thereof. The side-plates are generally wheel-shaped, and the eccentric element is generally cylindrical and concentric with the attached side-plates. The eccentric element has a lesser diameter than the side-plates such that the handle end section of a fishing rod can be places upon the eccentric element and confined laterally in place between the two side-plates. One of the side-plates of the eccentric assembly unit is pivotally attached to the adjacent driven element by a pivotal attachment. This pivotal attachment is positioned at a predetermined radial distance outward from the axis of rotation of the driven element, and at the same predetermined radial distance outward from the centerline axis of the eccentric element. The eccentric assembly unit can thus be selectively pivoted to various positions relative to the driven element. For example, it can be positioned in exact alignment with the axis of rotation of the driven element in which case there will be no eccentric function. However, typically, the fisherman will pivot the eccentric assembly unit to the degree desired such that the center axis of the eccentric assembly unit with its eccentric element supporting the rod handle will be offset from alignment with the axis of rotation of the driven element to cause the eccentric assembly unit to travel in a circular path to produce up and down motion of the rod handle and impart vertical motion to the rod tip as the driven element rotates.

The variable speed motor will have a knob switch to turn the motor on and off and to adjust the speed locally. The invention may also include a remote wireless controller/transmitter unit to control the variable speed motor. The remote controller/transmitter may also include timing circuitry to allow the fisherman to select the duration of the alternating on-period and the duration of the off-period of the repeating jigging cycles.

The advantages of the invention are:

(a) The jigging device is simple, having a rotating axle with a fixedly attached driven element and just one additional moving part—the eccentric assembly unit.

(b) The device has no loose parts to become lost or misplaced.

(c) The frequency and amplitude of the jigging movement can be easily changed throughout its entire range of operation.

(d) The jigging device can be mounted on various types of supports and structures. It can be readily moved to change fishing locations.

(e) The device can have optional wireless remote control capability.

(f) The remote controller/transmitter can have timing circuitry to set the duration of the alternating on-period and the duration of the off-period of repeating jigging cycles.

(g) The jigging device can be easily operated by fishermen of all ages and abilities, even while wearing gloves as in ice fishing.

(h) The fishing rod can be removed quickly and easily from the supports to set the hook with no interference or delay caused by any components of the device.

(i) The device can accommodate conventional rods and reels of various types and sizes.

(j) The device can be used as a simple rod holder by uncoupling and removing the variable speed motor.

These and other objects, features, aspects, and advantages of the invention will become more clearly understood from the following detailed description which, read together with the appended drawings, discloses representative embodiments of the invention.

This motorized jigging device for fishermen overcomes the disadvantages and limitations of automatic jigging devices presently in use or in the prior art. It is more versatile with the combination of features that it includes, and it is more simple, practical and convenient in addressing the specific needs of fishermen to reduce the effort and tedium of constant manual jigging of a fishing rod, especially in those situations where more than one fishing line may be employed.

| Elements | | | |
|---|---|---|---|
| 10 | motorized jigging device | 34 | eccentric element |
| 12 | fishing rod | 36 | inner side-plate |
| 14 | rod handle end section | 37 | outer side-plate |
| 16 | rod tip | 38 | pivotal attachment |
| 18 | base | 40 | motor support |
| 20 | fulcrum rod support | 42 | variable speed motor |
| 22 | rod slot | 44 | power source |
| 24 | line slot | 46 | detachable coupler |
| 26 | operating mechanism support | 48 | first rod support point |
| 28 | rotating axle | 50 | second rod support point |
| 30 | driven element | 52 | remote controlled controller/transmitter |
| 32 | eccentric assembly unit | | |

DETAILED DESCRIPTION OF THE INVENTION

The examples used herein are intended merely to facilitate an understanding of the ways in which the embodiments of the invention may be practiced and to further enable those having skill in the art to practice the concepts of the invention. Accordingly, the examples given should not be construed as limiting the scope of the invention.

Figure 1:
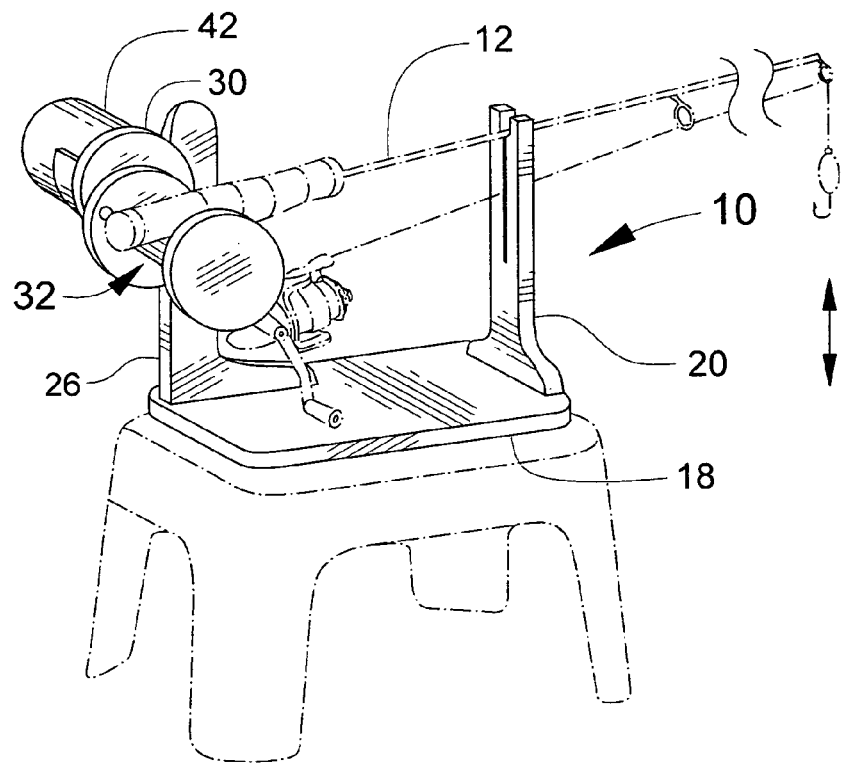
FIG. 1 illustrates a perspective view of the invention showing the eccentric assembly unit (32) at a slightly downward position of its circular path, and the fishing rod tip (16) at a slightly upward position.
Figure 2:
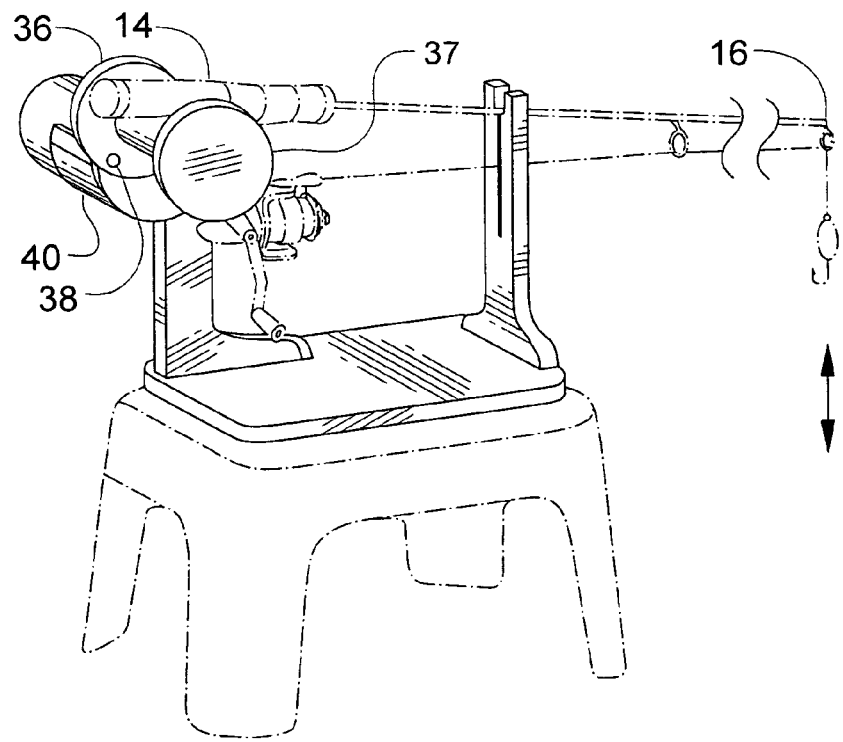
FIG. 2 is a perspective view of the invention showing the eccentric assembly unit (32) at a slightly upward position of its circular path, and the fishing rod tip (16) at a slightly downward position.

With reference to the drawings, and wherein like numerals designate like parts, and with particular reference to FIGS. 1 and 2, a motorized jigging device for fishing is disclosed generally indicated by reference numeral 10. The motorized fishing device 10 is used to support and manipulate a fishing rod 12 to produce a repetitive jigging or upward and downward movement to fishing rod 12. Motorized fishing device 10 can be made primarily from plastic, nylon, carbon fiber or aluminum and comprises a generally rectangular base 18 with a planar surface that supports an upright fulcrum rod support 20 and a spaced apart, upright operating mechanism support 26. Operating mechanism support 26 has a rotating axle 28 passing therethrough, and rotating axle 28 is fixedly attached at a right angle to a driven element 30 such that rotating axle 28 and driven element 30 rotate together as one. Operating mechanism support 26 supports eccentric assembly unit 32 which is pivotally attached to driven element 30 by pivotal attachment 38. Operating mechanism support 26 also has an attached motor support 40 to removably hold the variable speed motor 42.

Figure 3:
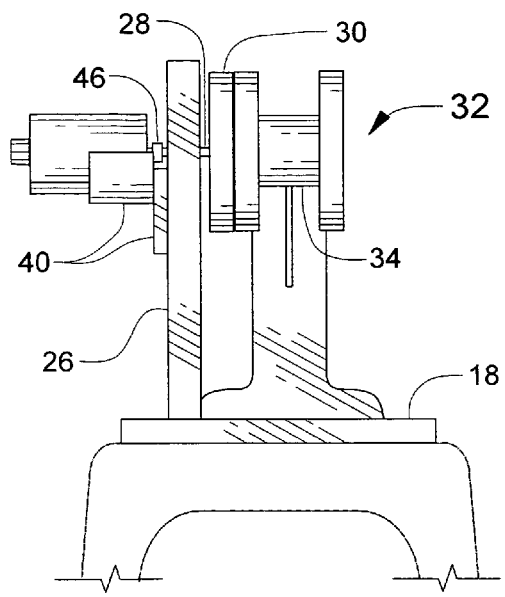
FIG. 3 is a rear view of the invention without a fishing rod wherein eccentric assembly unit (32) is positioned concentrically with driven element (30) resulting in zero (minimum eccentricity).
Figure 4:
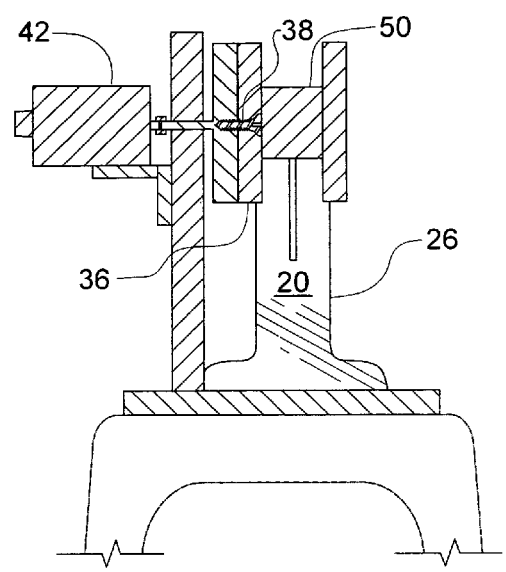
FIG. 4 is a rear sectional view of FIG. 3 of the invention without a fishing rod.
Figure 5:
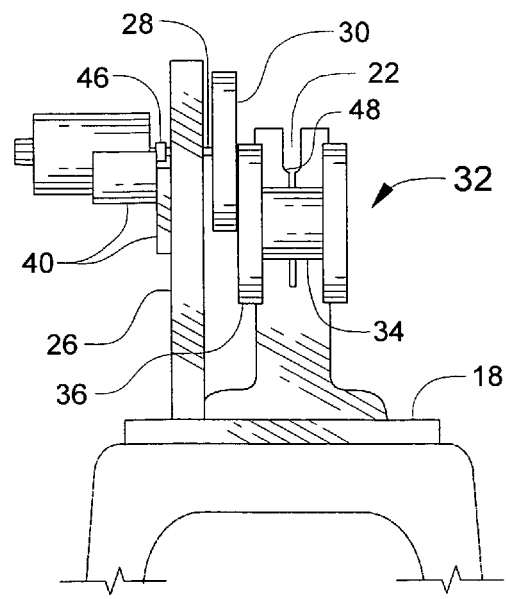
FIG. 5 is a rear view of the invention without a fishing rod wherein eccentric assembly unit (32) is positioned slightly eccentric to driven element (30) and is in a slightly downward position of its orbital path.
Figure 6:
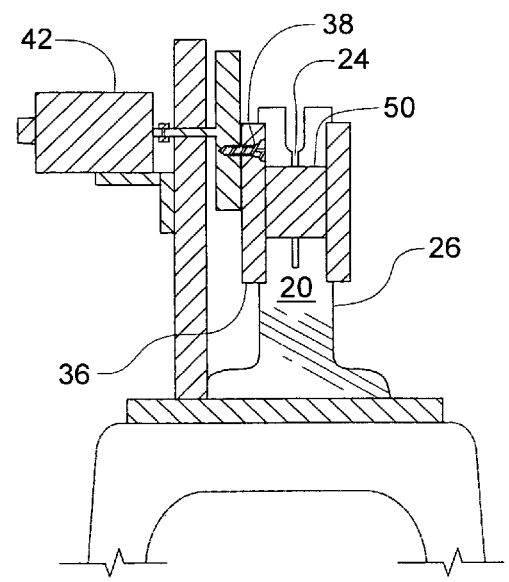
FIG. 6 is a rear sectional view of FIG. 5 of the invention without a fishing rod.
Figure 7:
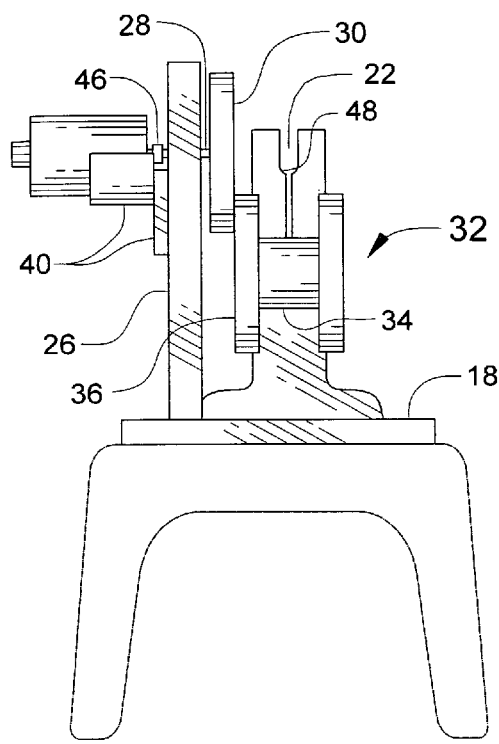
FIG. 7 is a rear view of the invention without a fishing rod wherein eccentric assembly unit (32) is positioned at maximum eccentricity to driven element (30) and is in its maximum downward position of its orbital path.
Figure 8:
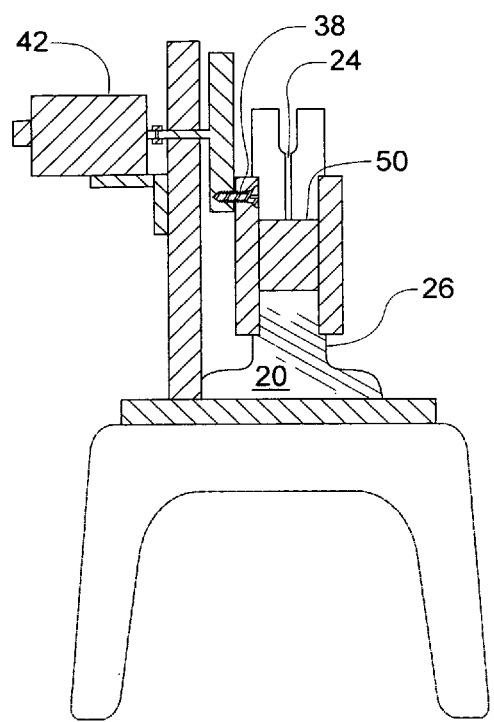
FIG. 8 is a rear sectional view of FIG. 7 of the invention without a fishing rod.
Figure 9:
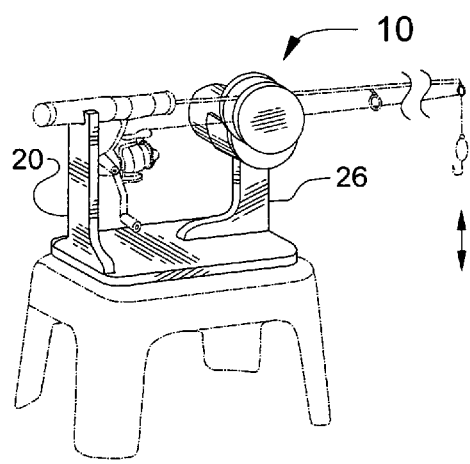
FIG. 9 is a perspective view of the invention showing an alternate embodiment having operating mechanism support (26) forward of fulcrum rod support (20).
Figure 10:
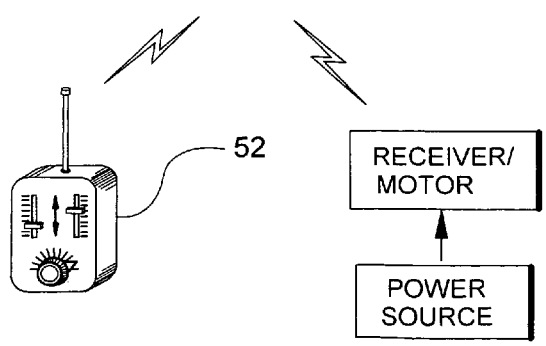
FIG. 10 illustrates the remote controlled controller/transmitter (52) and variable speed motor (42).

Eccentric assembly unit 32 can be a spool-shaped, integrally formed unit that further comprises a horizontal, cylindrical eccentric element 34 that has a vertical wheel-shaped or disk-shaped rim or inner side-plate 36 and a similar outer side-plate 37 fixedly attached thereto. Inner side-plate 36 of eccentric assembly unity 32 is attached to driven element 30 by pivotal attachment 38. Eccentric element 34 supports the rod handle end section 14 of fishing rod 12 at a first rod support point 48. Fulcrum rod support 20 includes a rod slot 22 to support and confine fishing rod 12. Fulcrum rod support 20 also provides a line slot 24 to allow the fishing line to be readily inserted and removed through the top of fulcrum rod support 20 to prevent abrasion of the fishing line during operation. Eccentric element 34 of eccentric assembly unit 32 provides a second rod support point 50 on which rod handle end section 14 rests between side-plates 36 and 37. Driven element 30 is pivotally attached in side-by-side contact to inner side-plate 36 of eccentric assembly unit 32 by pivotal attachment 38. The pivotal attachment point is located (near the rim) at a predetermined radial distance outward from the axis of rotation of driven element 30, and pivotal attachment 38 is located (near the rim) at the same radial distance outward from the center axis of eccentric element 34. This allows the centerline axis of the eccentric element 34 to be precisely aligned horizontally with the axis of rotation of driven element 30 (see FIGS. 3 and 4) whereby there will be zero eccentricity and no jiggling motion of the fishing rod 12 during rotation of driven element 30. However, for typical use, the fisherman can provide any amount of eccentricity anywhere, continuously, without any defined increments or set points, throughout the range of zero eccentricity to maximum eccentricity, maximum eccentricity being wherein the centerline axis of eccentric element 34 is aligned at maximum departure (see FIGS. 7 and 8) from being aligned horizontally with the axis of rotation of the driven element 30. Adjustment of the amount of eccentricity is performed by the fisherman by manually pivoting the eccentric assembly unit 32 to offset the centerline axis of eccentric element 34 from the axis of rotation of driven element 30 to the desired degree, so that as eccentric assembly unit 32 travels in a circular path it provides upward and downward movement to rod handle end section 14 resting on eccentric element 34, as driven element 30 rotates.

Figure 11:
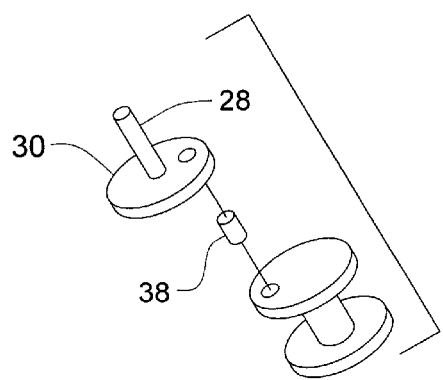
FIG. 11 is an exploded view of the rotating axle (28), the driven element (30), and the eccentric assembly unit (32).
Figure 12:
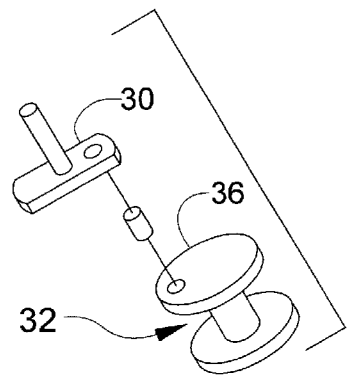
FIG. 12 is the same view as FIG. 11, but having an alternate embodiment of driven element (30).
Figure 13:
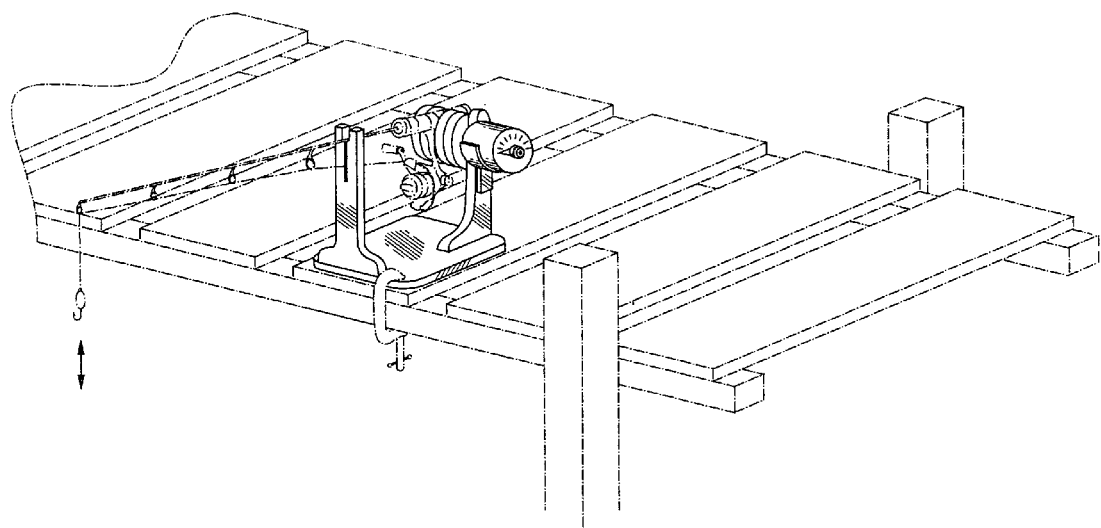
FIG. 13 illustrates the invention mounted on a dock.

Driven element 30 can be circular or wheel-shaped and match the size and shape of side-plates 36, 37 as illustrated in FIG. 11, or it may be a flat, generally rectangular shape as illustrated in FIG. 12. Pivotal attachment 38 can be a moderately tightened metal screw, bolt or other connection that can be tightened sufficiently to produce a snug, frictional fit between the face of driven element 30 and the face of the adjacent inner side-plate 36 such that eccentric assembly unit 32 will remain in place as pivoted and set in place by the fisherman during operation. Eccentric element 34 can be cylindrical, in which case eccentric assembly unit 32 will be a spool-shaped integral unit. Eccentric element 34 has a diameter less than that of side-plates 36, 37 such that rod handle end section 14 can rest on first rod support point 48 of eccentric element 34 while being laterally restrained between the two side-plates 36, 37. However, the diameter of eccentric element 34 can be as small as that of a rigid rod or wire. The fisherman can manually overcome the frictional interface attachment between inner side-plate 36 of eccentric assembly unit 32 and driven element 30 to adjust the amount of eccentricity of eccentric assembly unit 32 from driven element 30. This amount of eccentricity can be selected and positioned anywhere throughout a range of zero eccentricity to the maximum eccentricity, continuously, without any defined or set increments in position. After the fisherman positions eccentric assembly unit 32, it will remain in place by frictional contact with driven element 30 until the fisherman chooses to re-position eccentric assembly unit 32.

Variable speed motor 42 operates from a battery power source or from an AC electrical outlet and is geared down to produce low speed operation, or it may have a speed reduction gearbox to produce speeds in the range of approximately 10-100 rpm with torque of at least 15 kg-cm. Variable speed motor 42 is equipped with a knob switch for on-off and speed control setting. Variable speed motor 42 is coupled to rotating axle 28 by detachable coupler 46. Motor support 40 is attached to operating mechanism support 26 and is configured to hold variable speed motor 42 securely in place during operation, but to allow for easy removal when the fisherman chooses to use the motorized jigging device 10 as a simple rod holder without variable speed motor 42.

Motorized jigging device 10 can be provided with a remote wireless remote controlled controller/transmitter 52 to allow on-off switching and speed control adjustment of variable speed motor 42. Remote controlled controller/transmitter 52 can also include timing circuitry to allow the fisherman to select the duration of the alternating on-period and the duration of the off-period of repeating jigging cycles.

OPERATION AND USE OF THE INVENTION

To use the motorized jigging device 10, the fisherman connects to a power source and attaches base 18 to a suitable support or structure. He/she then places a conventional fishing rod 12 on first rod support point 48 and second rod support point 50. The fisherman adjusts the amplitude of the jigging movement by pivoting eccentric assembly unit 32 to offset the center axis of eccentric element 34 from the axis of rotation of driven element 30. The amount of this offset will determine the radius of the circular path traveled by eccentric assembly unit 32 and thus the amplitude of the upward and downward movement of rod handle end section 14 of fishing rod 12. During jigging operation, fishing rod 12 pivots vertically on first rod support point 48 on fulcrum rod support 20. The fisherman can operate the variable speed motor 42 using the switch/speed control knob on variable speed motor 42. The fisherman can also uncouple detachable coupler 46 and remove variable speed motor 42 to use the motorized jigging device 10 as a simple rod holder.

As another embodiment with a wireless remote controlled controller/transmitter 52, the fisherman can operate the variable speed motor 42 remotely. The fisherman can adjust switch the variable speed motor 42 on and off and adjust the speed remotely. Remote controlled controller/transmitter 52 can also include timing circuitry to allow the fisherman to select the duration of the alternating on-period and the duration of the off-period of repeating jigging cycles. The motorized jigging device 10 is compact and readily portable so it can be easily moved from one fishing location to another.

CONCLUSION

From the above-described features, it should can be seen that this invention is unique and has a number of significant advantages over the prior art. A number of significant advantages of this invention that mitigate or obviate the drawbacks of the prior art become apparent. This automatic, motorized jigging device is simpler, more convenient and more versatile than any of the prior art. It can be used by fishermen of all ages and abilities, even while wearing gloves as in ice fishing. It has few moving parts and no loose or interchangeable parts. It can be used with conventional rods and reels of various types and sizes. It can by mounted on various structures and is easy to move and set up from one fishing location to another. The motor can be easily removed to use the device as a simple rod holder. It can include a wireless remote controlled controller/transmitter for remote operation, including setting the duration of the alternating on-period and the duration of the off-period of repeating jigging cycles. It answers the heretofore expressed need for a more practical motorized jigging device.

Clearly, this invention is well adapted to meet the conditions of practical use, and it should be evident that this invention provides many advantages, has novel features, and is worthy of patentable merit over the prior art.

The invention claimed is:

1. A motorized jigging device for fishing with a variable speed motor capable of producing a repetitive upward and downward seesaw motion to a fishing rod placed thereon, said fishing rod having a rod handle end section and a rod tip, said motorized jigging device comprising a base, said base supporting a fulcrum rod support, an operating mechanism support with a motor support, said fulcrum rod support and said operating mechanism support being spaced longitudinally a predetermined distance apart along the underside of said fishing rod, said fulcrum rod support acting as a fulcrum having a first rod support point of said fishing rod while said operating mechanism support further contains a horizontal rotating axle passing therethrough, said rotating axle being connected with a detachable coupler to said variable speed motor at one end thereof, and with a driven element fixedly attached at the other end thereto and extending at a right angle therefrom such that said rotating axle and said attached driven element rotate together as one, said operating mechanism support further supporting an eccentric assembly unit comprising a horizontal, cylindrical eccentric element with a fixedly attached vertical side-plate at each end thereof, said eccentric element serving as a second rod support point with one said side-plate being pivotally attached side-by-side to said adjacent driven element by a pivotal attachment at a point wherein said pivotal attachment point is at a predetermined radial distance outward from the centerline axis of said eccentric element and at the same predetermined radial distance outward from the axis of rotation of said driven element such that said centerline axis of said eccentric element can be precisely aligned horizontally with said axis of rotation of said driven element thus producing zero eccentricity and no upward and downward seesaw motion to said fishing rod, but conversely for typical use, wherein the fisherman can provide any amount of eccentricity anywhere, continuously without any defined increments or set points, throughout the range of zero eccentricity to maximum eccentricity, maximum eccentricity being wherein said centerline axis of said eccentric element is aligned at maximum departure from being aligned horizontally with said axis of rotation of said driven element by adjustably pivoting said eccentric assembly unit to the degree desired such that said axis of rotation of said driven element and said centerline axis of said eccentric element are offset from one another whereby, during operation, said first rod support point remains stationary while said second rod support point moves in a circular path to produce upward and downward movement to said rod handle end section of said fishing rod, thus an angler can adjust the frequency of the up and down seesaw motion of said rod handle end section and said rod tip of said fishing rod by adjusting the speed of said variable speed motor, and the angler can also adjust the amplitude of the range of upward and downward movement of said rod tip of said fishing rod by pivoting said eccentric assembly unit to select the amount of eccentricity of said centerline axis of said eccentric element relative to said axis of rotation of said driven element.

2. The motorized fishing device of claim 1 further wherein a remote controlled controller/transmitter is provided and said variable speed motor has a compatible receiver to allow said variable speed motor to be switched on and off and to allow the speed of said variable speed motor to be regulated from said remote controlled controller/transmitter.

3. The motorized jigging device of claim 2 further wherein said remote controlled controller/transmitter and said variable speed motor receiver are provided with timing circuitry to allow the angler to select the time duration of the alternate on-periods and the time duration of the off-periods of repeating on-off cycles of operation of said variable speed motor.

4. The motorized jigging device of claim 3 wherein said fulcrum rod support is located forward of said operating mechanism support.

5. The motorized jigging device of claim 4 wherein said driven element is circular shaped to match the shape of said adjacent side-plate of said eccentric assembly unit.

6. The motorized jigging device of claim 3 wherein said operating mechanism support is located forward of said fulcrum rod support.

7. The motorized jigging device of claim 6 wherein said driven element is circular shaped to match the shape of said adjacent side-plate of said eccentric assembly unit.

8. The motorized jigging device of claim 3 wherein said driven element is circular shaped to match the shape of said adjacent side-plate of said eccentric assembly unit.

9. The motorized fishing device of claim 2 wherein said fulcrum rod support is located forward of said operating mechanism support.

10. The motorized jigging device of claim 9 wherein said driven element is circular shaped to match the shape of said adjacent side-plate of said eccentric assembly unit.

11. The motorized jigging device of claim 2 wherein said operating mechanism support is located forward of said fulcrum rod support.

12. The motorized jigging device of claim 2 wherein said driven element is circular shaped to match the shape of said adjacent side-plate of said eccentric assembly unit.

13. The motorized jigging device of claim 11 wherein said driven element is circular shaped to match the shape of said adjacent side-plate of said eccentric assembly unit.

14. The motorized jigging device of claim 2 wherein said driven element is configured as a flat, generally rectangular arm.

15. The motorized jigging device of claim 1 wherein said fulcrum rod support is located forward of said operating mechanism support.

16. The motorized jigging device of claim 15 wherein said driven element is circular shaped to match the shape of said adjacent side-plate of said eccentric assembly unit.

17. The motorized jigging device of claim 1 wherein said operating mechanism support is located forward of said fulcrum rod support.

18. The motorized jigging device of claim 17 wherein said driven element is circular shaped to match the shape of said adjacent side-plate of said eccentric assembly unit.

19. The motorized jigging device of claim 1 wherein said driven element is circular shaped to match the shape of said adjacent side-plate of said eccentric assembly unit.

20. The motorized jigging device of claim 1 wherein said driven element is configured as a flat, generally rectangular arm.

* * * * *